Nov. 6, 1923.

R. E. TILTON

CONNECTER

Filed March 3, 1921

1,473,362

INVENTOR
Roe E. Tilton
BY his ATTORNEY
T. F. Bourne

Patented Nov. 6, 1923.

1,473,362

UNITED STATES PATENT OFFICE.

ROE E. TILTON, OF COLUMBUS, OHIO.

CONNECTER.

Application filed March 3, 1921. Serial No. 449,373.

*To all whom it may concern:*

Be it known that I, ROE E. TILTON, a citizen of the United States, and a resident of Columbus, in the county of Franklin and State of Ohio, have invented certain new and useful Improvements in Connecters, of which the following is a specification.

The object of my invention is to provide a simple, cheap and effective connecter adapted to connect an electric conductor, cable or conduit to another part, such as to an outlet or junction box.

In carrying out my invention I provide a flexible extensible and retractive tubular member adapted to receive a cable, conductor, conduit, or the like, to grip the same firmly, said member being provided with means to connect it to another part for connecting the conductor or the like thereto in a firm yet readily removable manner.

My invention further comprises novel details of improvement that will be more fully hereinafter set forth and then pointed out in the claims.

Figure 1:
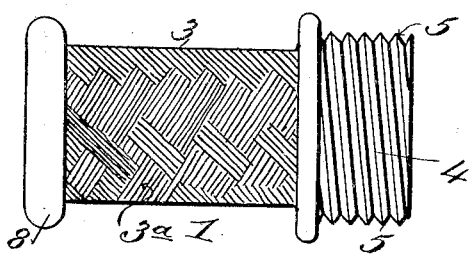
Figure 2:
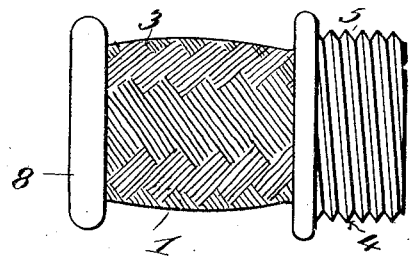
Figure 3:
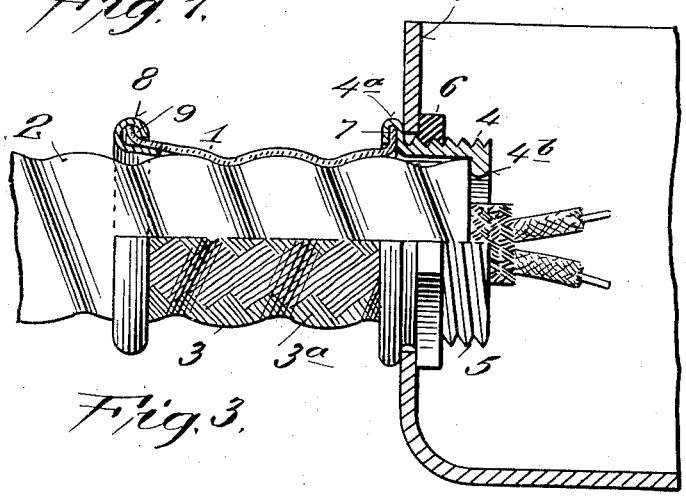
Figure 4:
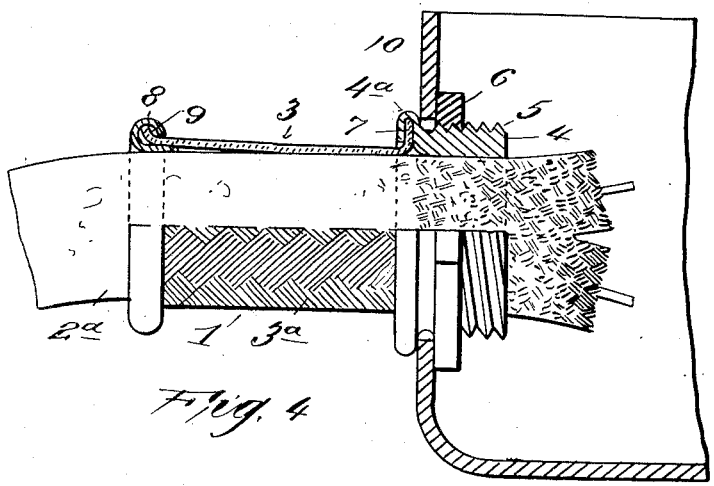

Reference is to be had to the accompanying drawings forming part hereof, wherein Fig. 1 is a side view of my improved connecter in its normal condition; Fig. 2 is a similar view illustrating the connecter member compressed or retracted to admit a cable, conductor, conduit or the like; Fig. 3 is a partly sectional view illustrating my improved connecter in use as adapted for an armored conductor, and Fig. 4 is a similar view illustrating my improved connecter as adapted for a cable or conductor.

Similar numerals of reference indicate corresponding parts in the several views.

The numeral 1 indicates a flexible tubular member adapted to be extended and to be retracted or compressed in the longitudinal direction to receive a conduit, such as an armored conductor 2, or a cable or similar conductor 2ª. Member 1 is made of woven or braided strands of metal, such as wire or other suitable material, indicated at 3, so organized that the tubular member may be compressed or retracted to increase its normal diameter and when the member is released it will elongate to reduce its diameter. In the example illustrated member 1 comprises strands 3ª, each comprising several wires side by side, woven or braided together in tubular form whereby the member may be readily compressed and elongated. At one end of member 1 is a coupling 4, shown in tubular form and provided with external threads 5 to receive nut 6, the coupling 4 also being shown having a flange at 4ª and compressed on the outturned end portion 7 of member 1 to secure the latter to the coupling. The opposite end of member 1 is shown provided with a ring-like protector 8, which is shown in tubular form having its outer edge bent back over and clamped upon the adjacent outturned end portion 9 of member 1. The protector 8 protects the adjacent end of member 1 to keep it from becoming frayed and to protect the fingers of the user.

In the form shown in Fig. 3 the coupling 4 has an inner flange 4ᵇ against which the end of the armored conductor or conduit 2 may bear to limit its position in the coupling. In Fig. 4 the coupling has no inner flange whereby the conductor or cable 2ª can be pulled through the coupling. The coupling 4 may be attached to an outlet or junction box 10, or to any other desired part, to which the conductor is to be connected.

When the conductor, cable or conduit is to be attached to my improved connecter the member 1 thereof is compressed, as by pushing against the end protector 8, to cause expansion of the member to increase its interior diameter, such as shown in Fig. 2, to readily admit the conductor, cable or conduit. When the conductor or conduit has been pushed as desired within member 1, while the latter is maintained compressed, said member will then be released and it will lengthen and thereby will reduce its diameter so as to grip the conductor, cable or conduit to retain the latter attached to the box or other part to which the coupling has been applied. By reason of contact of member 1 with the conductor, cable or conduit the latter can not be pulled away from the member because elongation of the latter tends to reduce its diameter, thereby to the more firmly grip the conductor, cable or conduit. When it is desired to remove the conductor, cable or conduit from member 1 it is merely necessary to compress the member, such as by pushing upon the protector 8, to increase diameter of the member whereby the conductor, cable or conduit may be readily pulled out from the member.

My improved connecter is simple and cheap to manufacture, and has the advantage that it may be expeditiously connected to and removed from a conductor, cable, conduit or the like without requiring the use of tools.

Having now described my invention, what I claim is:

1. A connecter comprising a flexible tubular member adapted to compress to increase its diameter and to elongate longitudinally to reduce its diameter to receive and retain a conduit or its described equivalent and provided with tubular means to connect said member to an object for connecting said conduit or its described equivalent thereto, the bores of said member and tubular means being in alignment.

2. A connecter comprising a flexible tubular member having interwoven wires adapted to be compressed to increase its diameter and elongated to reduce its diameter to respectively receive and retain a conduit or its described equivalent, a tubular coupling attached to one end of said member, the bores of said member and coupling being in alignment, and means to secure the coupling to an object.

3. A connecter comprising a flexible tubular member adapted to be compressed to increase its diameter and elongated to reduce its diameter to respectively receive and retain a conduit or its described equivalent, a tubular coupling attached to one end of said member, the bores of said member and coupling being in alignment, and means to secure the coupling to an object, said member having a protector secured to its end opposite the coupling.

4. A connecter comprising a flexible tubular member adapted to be compressed to increase its diameter and elongated to reduce its diameter to respectively receive and retain a conduit or its described equivalent, and a tubular coupling having a flange secured to an end of said member, the bores of said member and coupling being in alignment, said coupling having means to attach it to an object.

5. A connecter comprising a flexible tubular member adapted to be compressed to increase its diameter and elongated to reduce its diameter to respectively receive and retain a conduit or its described equivalent, a coupling having a flange secured to an end of said member, said coupling having means to attach it to an object, and a protector secured to the end of said member opposite the coupling.

6. A connecter comprising a tubular flexible member adapted to be compressed to increase its diameter and elongated to reduce its diameter to respectively receive and retain a conduit or its described equivalent, a coupling having a thread and provided with means to secure it to an end of said member, and a nut on said thread to secure the coupling to an object.

7. A connecter comprising a tubular flexible member adapted to be compressed to increase its diameter and elongated to reduce its diameter to respectively receive and retain a conduit or its described equivalent, a coupling having a lateral flange clamped over an outwardly turned portion of said member, said coupling having external threads, and a nut upon said threads adapted to clamp an object between the nut and said flange to secure the connecter to the object.

8. A connecter comprising a tubular flexible member adapted to be compressed to increase its diameter and elongated to reduce its diameter to respectively receive and retain a conduit or its described equivalent, a coupling having a lateral flange clamped over an outwardly turned portion of said member, said coupling having external threads, a nut upon said threads adapted to clamp an object between the nut and said flange to secure the connecter to the object, and a protector secured upon the end of the connecter opposite the coupling.

9. A connecter comprising a flexible tubular member adapted to be compressed longitudinally to increase its diameter to receive a conduit or its described equivalent, and to elongate to reduce said diameter to retain said conductor, cable or conduit, said member being provided with tubular means distant from one end of the member to connect it to an object leaving the other portion of the connecter free to be compressed and to elongate for connection with said conduit or its described equivalent, said tubular member and tubular means having their bores in alignment.

Signed at Columbus, in the county of Franklin and State of Ohio, this 31st day of January, A. D., 1921.

ROE E. TILTON.